US009273415B2

(12) United States Patent
Kim et al.

(10) Patent No.: US 9,273,415 B2
(45) Date of Patent: Mar. 1, 2016

(54) METHODS FOR PREPARING CARBON HYBRID MATERIALS

(75) Inventors: Ho-Cheol Kim, San Jose, CA (US); Leslie E. Krupp, Isleton, CA (US); Philip M. Rice, Morgan Hill, CA (US); Robert M. Shelby, Boulder Creek, CA (US); Angela-Kristina Speidel, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 13/607,166

(22) Filed: Sep. 7, 2012

(65) Prior Publication Data

US 2014/0072700 A1   Mar. 13, 2014

(51) Int. Cl.

| | |
|---|---|
| B05D 1/02 | (2006.01) |
| D01D 5/00 | (2006.01) |
| B05D 1/00 | (2006.01) |
| B05D 1/34 | (2006.01) |
| B05D 1/04 | (2006.01) |
| D01F 1/10 | (2006.01) |
| D01F 9/14 | (2006.01) |
| H01M 4/96 | (2006.01) |
| B82Y 10/00 | (2011.01) |
| H01M 12/08 | (2006.01) |

(52) U.S. Cl.
CPC .............. *D01D 5/0007* (2013.01); *B05D 1/007* (2013.01); *B05D 1/02* (2013.01); *B05D 1/04* (2013.01); *B05D 1/34* (2013.01); *D01F 1/10* (2013.01); *D01F 9/14* (2013.01); *H01M 4/96* (2013.01); *B82Y 10/00* (2013.01); *H01M 12/08* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 7,229,944 B2 | 6/2007 | Shao-Horn et al. | |
| 7,390,760 B1 * | 6/2008 | Chen et al. | 442/341 |
| 2002/0175449 A1 * | 11/2002 | Chu et al. | 264/465 |
| 2006/0019819 A1 * | 1/2006 | Shao-Horn et al. | 502/4 |
| 2007/0048521 A1 | 3/2007 | Istvan | |
| 2010/0081351 A1 | 4/2010 | Hong et al. | |
| 2010/0126870 A1 | 5/2010 | Istvan et al. | |
| 2011/0171565 A1 | 7/2011 | Birkan et al. | |
| 2011/0224330 A1 | 9/2011 | Sodano et al. | |

OTHER PUBLICATIONS

Frenot et al. "Polymer nanofibers assembled by electrospinning", Current Opinion in Colloid and Interface Science, 8 (2003), p. 64-75.*

Huang et al., "A review on polymer nanofibers by electrospinning and their applications in nanocomposites," Composites Science and Technology 63 (2003) pp. 2223-2253.

(Continued)

*Primary Examiner* — Shamim Ahmed
*Assistant Examiner* — Bradford Gates
(74) *Attorney, Agent, or Firm* — Shumaker & Sieffert, P.A.

(57) ABSTRACT

A method of preparing a fiber including electro-spinning onto a substrate polymer solutions from a plurality of jets to form a network of filaments, wherein at least one jet sprays onto the substrate a first chemical mixture including a carbon fiber precursor compound, and at least one other jet sprays onto the substrate a second chemical mixture comprising a sacrificial polymer and a precursor compound of a functional material; and processing the filaments on the substrate, thereby forming an arrangement of carbon fibers having the functional material deposited thereon.

18 Claims, 7 Drawing Sheets

(56) References Cited

OTHER PUBLICATIONS

Fang et al., "Development of Multiple-Jet Electrospinning Technology," Polymeric Nanofibers, Chapter 7 (2006) pp. 91-105.

Ji et al., "Fabrication of carbon nanofiber-driven electrodes from electrospun polyacrylonitrile/polypyrrole bicomponents for high-performance rechargeable lithium-ion batteries," Journal of Power Sources 195 (2010) pp. 2050-2056.

* cited by examiner

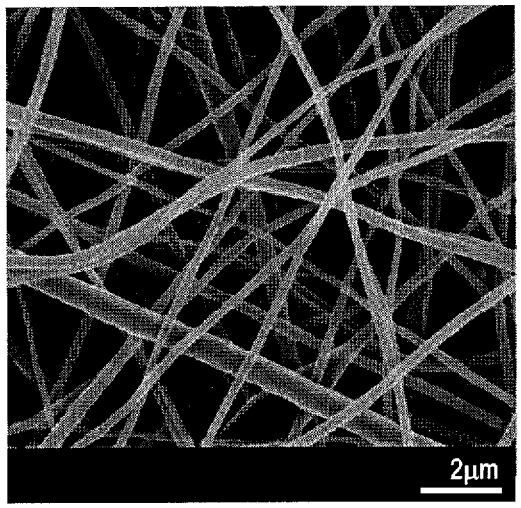
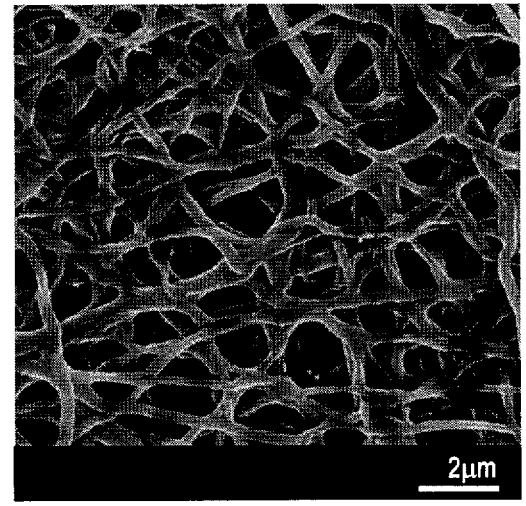
FIG. 2A　　　　FIG. 2B
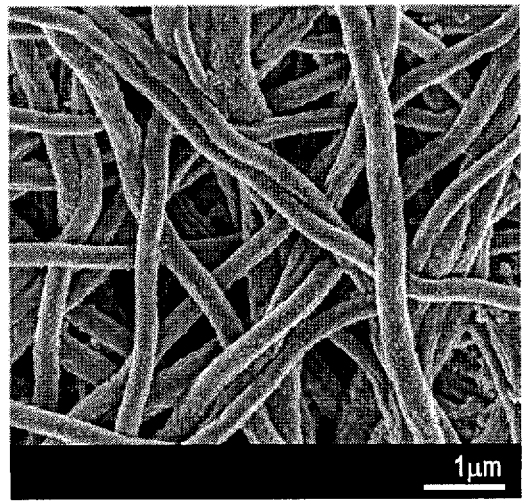
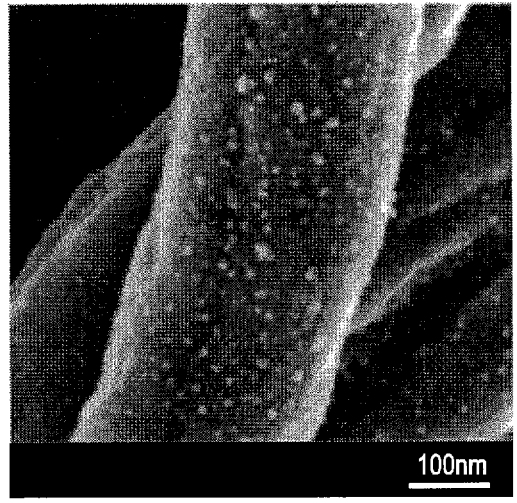
FIG. 3A　　　　FIG. 3B

METHODS FOR PREPARING CARBON HYBRID MATERIALS

BACKGROUND

Carbon materials such as graphite, glassy carbon, carbon black, graphene, and carbon nanotubes (CNT) have been widely used as electrodes of electrochemical devices due to their conductivity, abundance and electrochemical stability. While carbon itself can be used for electrode applications, it can be hybridized with functional materials such as catalysts (e.g., metals, semiconductors, etc.) to improve performance. Typically the hybridization of functional materials with carbon has been done using common material deposition methods such as, for example, vacuum deposition, solution deposition, spraying, electroplating, and high energy irradiation.

SUMMARY

Drawbacks of common material deposition methods described above include, for example, the need for a high vacuum environment, multiple process steps, and the large amounts of energy to run the material deposition process. Sometimes the material deposition process employed limits the candidate materials for hybridization.

In general, the present disclosure describes a simple multiple jet electrospinning method of fabricating nanostructured carbon materials having a surface decorated and/or at least partially coated with a functional material.

In one embodiment, the invention is directed to a method of preparing a fiber, including electro-spinning onto a substrate polymer solutions from a plurality of jets to form a network of filaments, wherein at least one jet sprays onto the substrate a first chemical mixture including a carbon fiber precursor compound, and at least one other jet sprays onto the substrate a second chemical mixture including a sacrificial polymer and a precursor compound of a functional material. The filaments are processed on the substrate, thereby forming an arrangement of carbon fibers having the functional material deposited thereon.

In another embodiment, the present disclosure is directed to a method including:

(a) spraying from at least one first orifice a first solution onto a surface of a substrate, wherein the first solution includes a carbon fiber precursor compound;

(b) spraying from at least one second orifice a second solution onto a surface of the substrate, wherein the second solution includes a sacrificial polymer and a precursor compound of a functional material;

(c) forming a first filament from the first jet, and forming a second filament from the second jet;

(d) rotating the substrate and collecting the first filaments and the second filaments to form a mat including a network of the first and the second filaments;

(e) heating the mat to a first temperature above a glass transition temperature of the sacrificial polymer; and (f) heating the mat to a second temperature above the first temperature and sufficient to:
  (i) form the functional material from the precursor compound of the functional material, and
  (ii) carbonize the carbon fiber precursor compound to form an arrangement of carbon fibers; wherein the functional materials contact a surface of the carbon fibers.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2A is a scanning electron microscope (SEM) image of a carbon web structure formed by single jet electrospinning of polyacrylonitrile (PAN).

FIG. 2B is a SEM image of a carbon web structure formed using a two jet electrospinning process with PAN and polyethylene oxide (PEO) as described in Example 1.

FIG. 3A is a low magnification SEM image of a web of surface-decorated carbon fibers prepared by two jet electrospinning of PAN and PEO+manganese acetoactonate (MnAc), and subsequently heat treated for carbonization as described in Example 1.

FIG. 3B is a high magnification SEM image of the carbon fibers of FIG. 3A, which shows nanoparticles of manganese oxide formed on the surface of the carbon fibers.

Like symbols in the figures indicate like elements.

DETAILED DESCRIPTION

This disclosure is directed to a method for making nanostructured carbon hybrid materials by multiple-jet electrospinning. In this method at least a first jet in a multiple-jet array sprays onto a surface of a disk-like substrate a first solution including a carbon fiber precursor compound. At least a second jet in the multiple-jet array sprays onto the surface of the substrate a second solution including a functional material precursor compound and a sacrificial polymer. The jets and/or the substrate are rotated with respect to one another, and outputs of the first and the second jets form on the substrate a web-like composite mat-like network of filaments.

This filamentous mat is then thermally treated at a temperature sufficient to transform the carbon fiber precursor compound into carbon fibers. The thermal treatment also converts the functional material precursor compound into a functional material. The sacrificial polymer flows at a temperature above its glass transition temperature ($T_g$) to deliver the functional material on the surface of the carbon fibers, and then the sacrificial polymer subsequently substantially decomposes. A web of carbon fibers is formed having a surface at least partially coated with the functional material.

Figure 1:
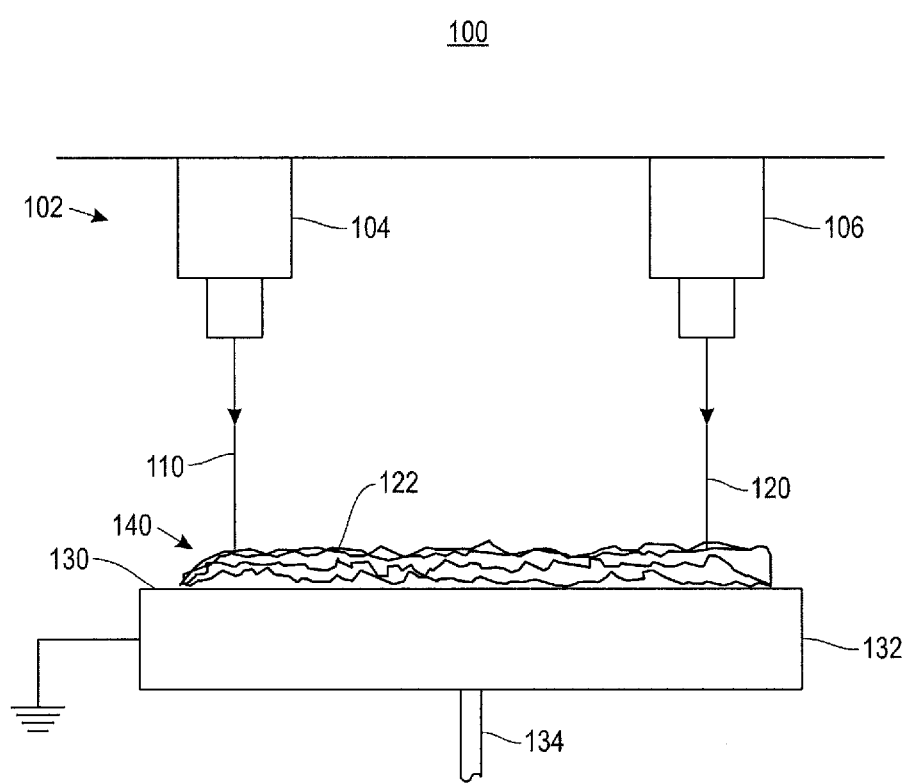
FIG. 1 is a schematic diagram of an embodiment of a multiple jet electrospinning apparatus that can be used to make carbon hybrid materials according to this disclosure.

FIG. 1 illustrates an embodiment of a multiple jet electrospinning apparatus 100 that can be used to make nanostructured carbon hybrid materials according to the present disclosure. The apparatus 100 includes an array 102 of jets each configured with a suitably-sized orifice to emit a fine stream of a liquid when a suitable voltage is applied. In the embodiment shown in FIG. 1, the array 102 includes at least two jets 104 and 106, but it will be understood that the array 102 could include any suitable number of jets necessary for a particular application. In the embodiment of FIG. 1, the first jet 104 is configured to spray a fine stream of a first liquid including a carbon fiber precursor compound 110. The second jet 106 is configured to spray a fine stream 120 of a second liquid including a sacrificial polymer compound and at least one functional material precursor compound.

After emerging from the jets 104 and 106, the streams 110 and 120 form thin, elongate filaments 122, which are collected on a surface 130 of a spinning, disk-like collector 132 that rotates about a shaft 134. The collected filaments 122 form a mat-like composite network of filaments 140.

In some embodiments, the first liquid 110 sprayed from the first jet 104 is a first chemical mixture, preferably a solution, including a carbon fiber precursor compound. As used herein carbon fiber precursor compound refers to a polymeric material that may be thermally treated and carbonized to form a carbon fiber. Suitable examples of carbon fiber precursor compounds include, but are not limited to, polymeric materials such as polyacrylonitrile (PAN), cellulosic precursors, pitch precursors, non-heterocyclic aromatic polymer precursors (such as phenolic polymers, phenol formamide resincs, polyacenaphtahlene, polyacrylether, certain polyamides, and polyphenylene), aromatic heterocyclic polymer precursors (such as polyimides, polybenzimidazole, polybenzimidazonium salt, polytriadizoles), polyvinyl chloride, polymethyl vinyl ketone, polyvinyl alcohol and poly vinyl acetate.

The carbon fiber precursor compound may optionally be mixed with or dissolved in a suitable solvent such as, for example, N-N'-dimethylformamide (DMF), dimethylacetate (DMAc), tetrahydrofuran (THF), dimethyl sulfoxide (DMSO), or trifluoro acetic acid.

The amount of the carbon fiber precursor compound in the first solution may vary widely, but is typically about 1 wt % to about 20 wt %, or about 5 wt % to about 10 wt %, or about 8 wt %.

The second chemical mixture 120, preferably a solution, sprayed from the second jet 106 includes a functional material precursor compound and a sacrificial polymer compound. The term sacrificial polymer as used herein refers to polymer that at least partially decomposes when the mat-like network 140 is heated, and preferably substantially decomposes if the network 140 is heated to a sufficiently high temperature. The decomposing sacrificial polymer compound initially flows at temperatures above its glass transition temperature (Tg) to distribute the dispersed functional material precursor compound or the functional material itself onto the surface of the filaments. As the filaments are further heated, the carbon fiber precursor compound carbonizes to form an arrangement of carbon fibers. In some embodiments the functional material remains randomly distributed on the surface of the carbon fibers after the mat-like-network of filaments 140 is carbonized, while in other embodiments the functional material partially or completely coats the carbon fibers.

Suitable sacrificial polymers include, but are not limited to, poly(ethylene oxide) (PEO), poly(methyl methacrylate) (PMMA), polystyrene (PS), polypropylene oxide (PPO), polyacrylates, polyvinylfluoride, poly(butyl methacrylate), polycarprolactam, polylactides, polyacrylic acid, polyvinyl pyridine, polyvinyl benzyl alcohol, polyesters, polyamides, and polycarbonates. These polymeric materials can be homopolymers or copolymers such as random copolymers, block copolymers or graft copolymers.

The sacrificial polymer may optionally be combined with a suitable solvent as necessary for a particular application, such as, for example, DMF, DMSO, DMAc, toluene, anisole, chloroform, cyclohexane, THF, diethylamine, diethyl ether, ethyl acetate, formamide, isopropyl alcohol, tirfluoro acetic acid, and/or pyridine.

The functional material precursor compound may be selected from any material that can be thermally decomposed at or below the carbonizing temperature to form a functional material. Examples of functional materials include, but are not limited to, metal oxides, semiconductors, metals, carbons and the like. For example, functional material precursor compounds that can be used to deposit a metal (such as Pt, Pd, Ag, Au, Ru, Ni, Co, Mn, Cr, Sn, W, Ta, Ti, Mo, Rh, Re, Ir, Hf, Zr, Fe and combinations thereof), or a metal oxide (for example, MnOx, MoOx, TiOx, PbOx, WOx, RuOx, ReOx, NiOx, FeOx, TcOx, RhOx, IrOx, CrOx, CeOx, ZrOx, SnOx and combinations thereof) on the surface of a carbon fiber include, but are not limited to, metal acetates, metal hydroxide, metal acetylacetonate, metal nitrates, metal sulfates, metal carbonates, metal chloride and the like.

After the mat-like construction 140 of filaments 122 is fully formed, the construction 140 is optionally removed from the surface 130 of the disk-like collector 132 and thermally treated. The thermal treatment initially heats the filaments 122 to a temperature sufficient to cause the sacrificial polymer to flow and randomly distribute and/or at least partially coat the functional material precursor compound onto the surface of the filamentous strands of the carbon fiber precursor compound. With further heating to a temperature sufficient to carbonize the filaments of the carbon fiber precursor compound and transform the functional material precursor compounds into functional materials, the sacrificial polymer substantially fully decomposes, leaving a web-like mat of carbon fibers having their surfaces randomly decorated and/or coated with the functional materials.

The thermal treatment protocol will of course vary depending on the materials selected for use in the process, but typically includes a first heating step in which the mat-like construction of filaments 140 is heated from room temperature to a temperature above the glass transition temperature (Tg) of the sacrificial polymer compound, typically to about 200° C. to about 500° C., and in some embodiments to about 250° C. The filaments 122 in the mat-like construction 140 are then heated in a second heating step to a temperature sufficient to cause: (1) the functional material precursor compounds to form functional materials, and (2) the carbon fiber precursor compounds to form carbon fibers. This second heating step, which is typically conducted at about 500° C. to about 1000° C., in some embodiments at about 850° C., also decomposes the sacrificial polymer and randomly deposits and/or coats the functional materials on the surface of the carbon fibers as said fibers are formed.

The hybrid carbon fibers with functional materials randomly distributed on their surfaces may then be cooled to room temperature and further processed for a particular end use application. The amount and morphology of the functional materials may be controlled by controlling the mixing composition of the functional material precursor and the sacrificial polymer. The functional material decorating the surface of the carbon fiber is in intimate contact with the surface of the carbon fiber. For example, the interface between the functional material and the carbon fiber may in some embodiments be sufficiently good to transport carriers such as electrons, which can make the decorated carbon fibers useful as catalysts. In some embodiments the functional materials may fully or partially coat the carbon fibers.

The first and the second heating steps may be conducted in air or in an inert atmosphere as necessary. Optionally, after the first heating step and/or the second heating step, the mat-like filament construction 140 may be maintained at a selected temperature for an extended time. In some embodiments, suitable extended heating times of about 0.5 hours to 2 hours may be used between each of the first and the second heating steps, preferably about 1 hour.

The process of this disclosure will now be more fully illustrated by the following non-limiting examples.

EXAMPLES

Example 1

PAN, PEO and manganese acetylacetonate (MnAc) were purchased from Sigma-Aldrich Corp., St. Louis, Mo., and used as received. The carbon fiber precursor PAN was dissolved in N-N'-dimethylformide (DMF) to make an 8 wt % solution. The sacrificial polymer PEO and the functional material precursor MnAc were dissolved in DMF to make a mixture. These polymer solutions (i.e., PAN and PEO+MnAc) were each loaded into 12 ml disposable syringes. A blunt tip needle was used as an orifice. High voltage (e.g., 15 kV) was applied to the needles to form polymer jets.

Electrospun filaments were collected on a rotating disc type collector that was electrically grounded. After electrospinning, the composite membrane (or web-like mat) on the collector was dried under ambient conditions. The web-like mat was carbonized using a cylinder type furnace in a controlled environment.

The thermal profile used for carbonization was: RT to 250° C. under air, iso at 250° C. for 1 hr under air, heating to 850° C. under nitrogen, iso at 850° C. for 1 hr under nitrogen, and then cooling down to RT.

FIG. 2A shows carbon fibers prepared from a pure PAN solution, and FIG. 2B shows carbon fibers produced from a two jet process (PAN and PEO each having a dedicated jet). FIG. 2B shows that the PEO jet affects the connectivity of carbon fibers after carbonization. While not wishing to be bound by any theory, this is likely due to the flow of PEO during thermal treatment, which moves the PAN fibers and binds them together.

FIGS. 3A and 3B are SEM micrographs of carbon nanofibers prepared by the multi-jet process of Example 1 (PAN and PEO+MnAc, each having a dedicated jet). The sample was heat-treated under the conditions mentioned above. It is clear that the surface of the carbon fibers contains numerous nanoparticles which were delivered from the PEO+MnAc mixture during the thermal treatment.

Figure 4:
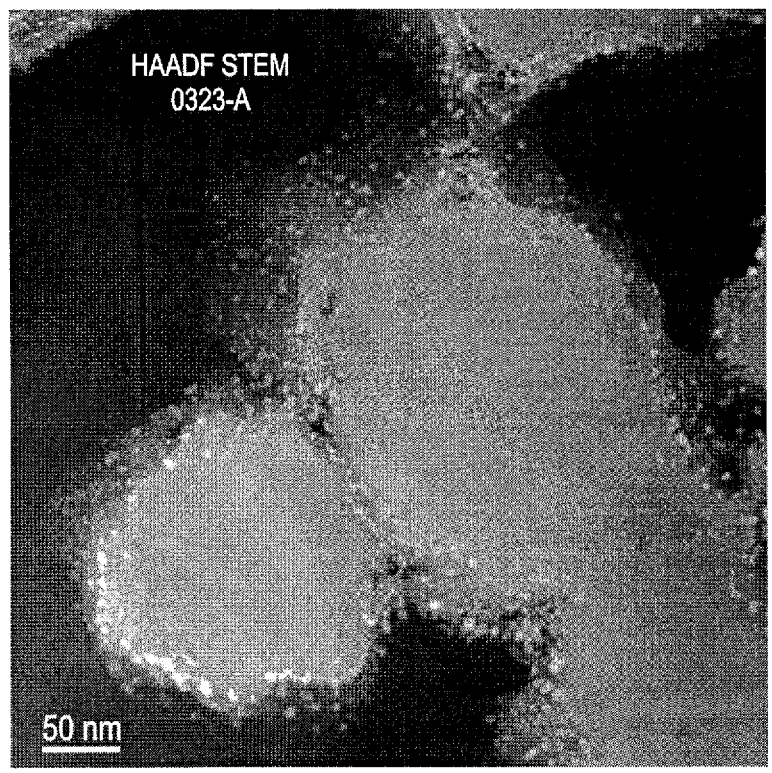
FIG. 4 is a cross-sectional transmission electron microscope (TEM) image of the carbon nanofibers of FIG. 3A, which shows surface decoration of manganese oxide on the carbon fiber surface.

FIG. 4 shows a cross-sectional TEM micrograph of the carbon fiber hybrid. It clearly shows the manganese oxide nanoparticles are located selectively at the surface of the carbon fibers, which indicates that the PEO fibers deliver the metal oxide precursor on the surface of PAN and eventually onto the carbon fibers.

Figure 5:
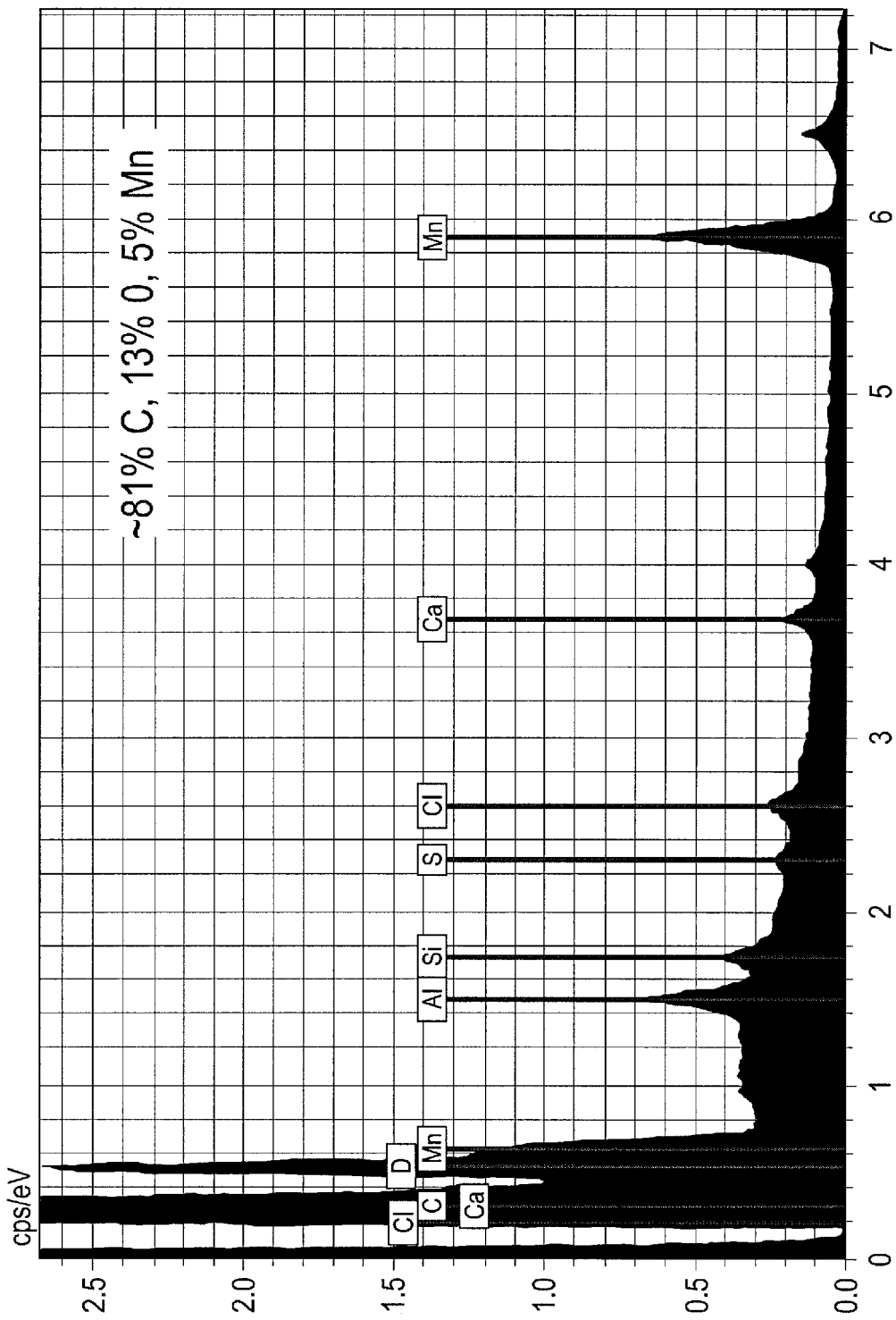
FIG. 5 is energy dispersive X-ray (EDX) data of the carbon fibers of FIG. 3A.

FIG. 5 shows EDX data of the carbon hybrid of FIG. 3A. These data show a strong peak of Mn at 5.9 keV, which corresponds to 5 at % of Mn in the sample.

Figure 6:
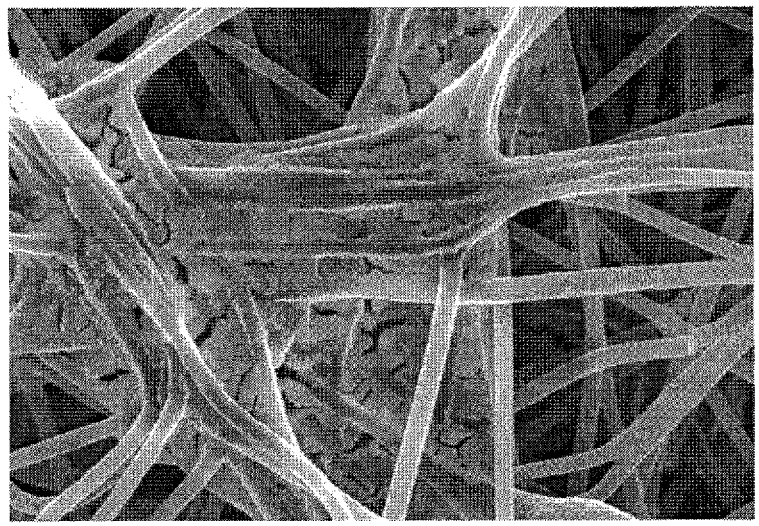
FIG. 6 is a SEM image of carbon fiber soaked into a metal oxide precursor solution and thermally treated.

As a comparison, a carbon fiber web was soaked with metal oxide solution and subsequently thermally treated. In this case, as shown in FIG. 6, the metal oxide precursors are aggregated macroscopically and form large domains between the fibers.

Example 2

Figure 7:
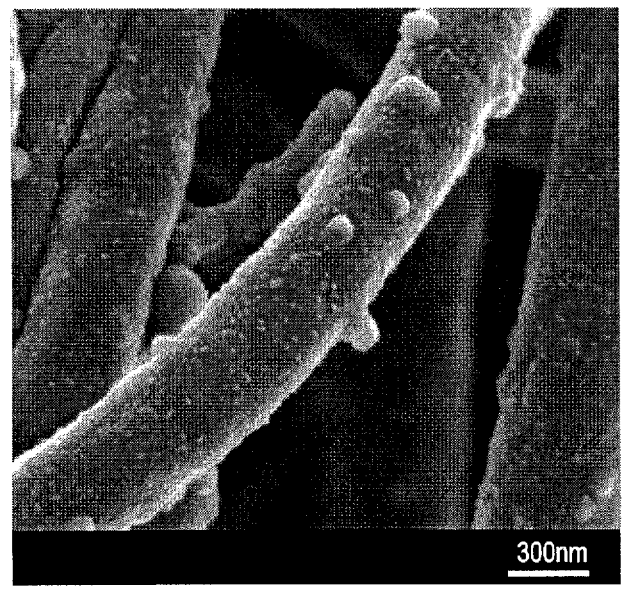
FIG. 7 is a SEM image of carbon fibers that have been surface decorated with graphite particles as described in Example 2.

Samples were prepared using the same method described in Example 1. Instead of using manganese acetylacetonate as a functional material precursor, graphite nanoflakes (from Asbury Carbon, Asbury, N.J.) were dispersed into a PEO solution in DMF. The sample was thermally treated to convert the carbon fiber precursor compound PAN into carbon and decompose the sacrificial polymer PEO. FIG. 7 is a SEM micrograph of the carbon fiber hybrid, which clearly shows the surface of carbon fibers are decorated with graphite nanoflakes, resulting in a very bumpy surface morphology on the surface of the carbon fiber.

Example 3

This example describes using a nanostructured carbon hybrid as an electrode of a lithium-oxygen battery, which is a high energy density metal-oxygen battery. A SWAGELOK type cell structure as shown in a schematic exploded view in FIG. 8 was used to prepare a battery cell.

Figure 8:
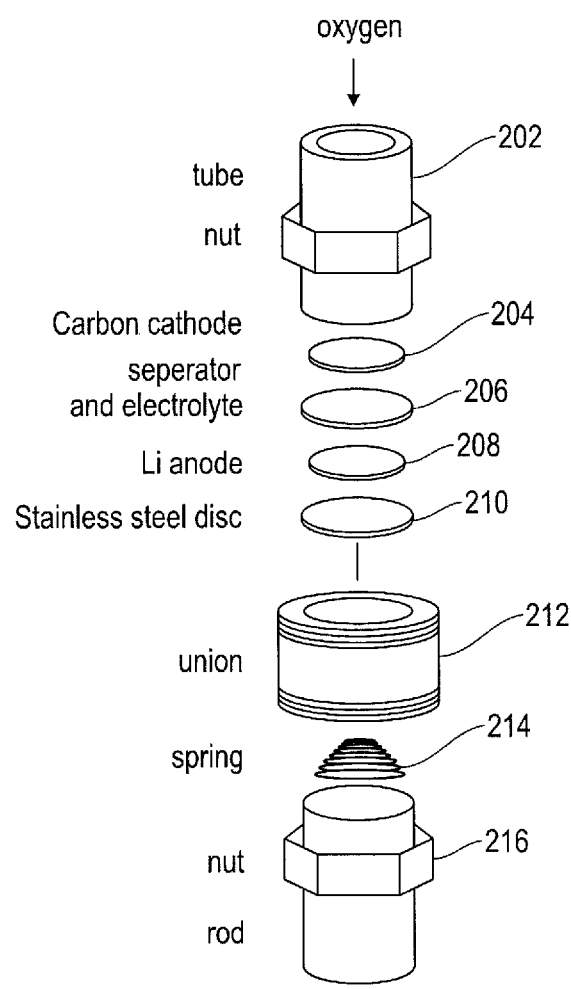
FIG. 8 is a schematic, exploded view of a SWAGELOK type lithium-oxygen battery utilized in Example 3.

As shown in FIG. 8, the battery cell 200 included a tube 202 through which oxygen gas flows into a carbon cathode 204, a separator and electrolyte 206, a Li anode 208, a stainless steel separator disk 210, a union assembly 212, a compression spring 214 and a retaining nut and rod 216.

The battery was discharged to 2.0V with a current density of 200 $\mu A/cm^2$ and recharged to 4.7V with the same current density. 1 M lithium bis(trifluoromethane sulfonyl imide) (LiTFSI) in dimethoxy ethane (DME) was used as an electrolyte.

Figure 9:
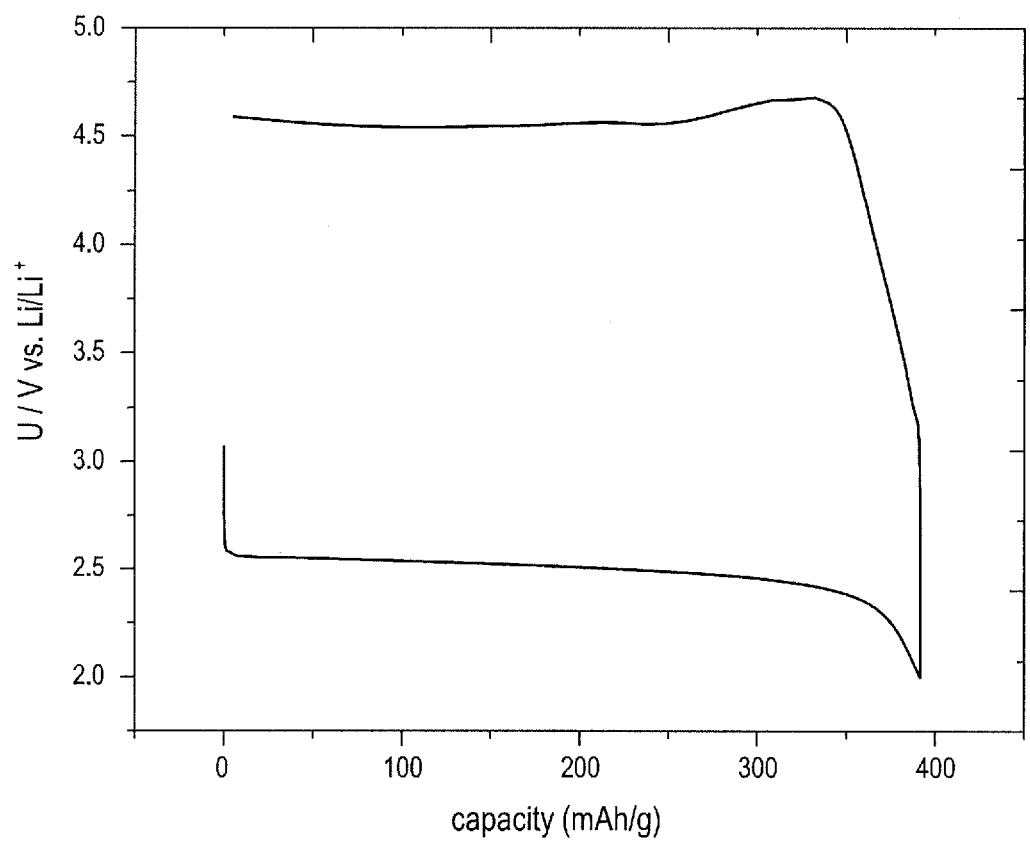
FIG. 9 is a discharge-charge plot of the lithium-oxygen battery shown in FIG. 8 and used in Example 3.

FIG. 9 shows a potential-capacity plot of the lithium-air battery during a discharge and charge process.

Various embodiments of the invention have been described. These and other embodiments are within the scope of the following claims.

The invention claimed is:

1. A method of preparing a fiber, comprising:
   (a) electro-spinning onto a substrate polymer solutions from a plurality of jets to form a network of filaments, wherein at least one jet sprays onto the substrate a first chemical mixture comprising a carbon fiber precursor compound to form a plurality of first filaments, and at least one other second jet, different from the first jet, sprays onto the substrate a second chemical mixture comprising a sacrificial polymer and a precursor compound of a functional material to form a plurality of second filaments different from the first filaments; and
   (b) thermally treating the first and the second filaments to a first temperature sufficient to cause the sacrificial polymer to flow onto the surfaces of the first filaments; and
   (c) thermally treating the first filaments to a second temperature greater than the first temperature to form an arrangement of carbon fibers, substantially decompose the sacrificial polymer, and transform the functional material precursor compound into a functional material, wherein the functional material is located selectively at the surface of the carbon fibers.

2. The method of claim 1, wherein thermally treating the first and the second filaments to a first temperature comprises heating the first and the second filaments to a temperature above a glass transition temperature of the sacrificial polymer.

3. The method of claim 1, wherein the carbon fiber precursor compound comprises polyacrylonitrile (PAN).

4. The method of claim 1, wherein the sacrificial polymer comprises poly(ethylene oxide) (PEO).

5. The method of claim 1, wherein the precursor compound of the functional material is selected from the group consisting of metal oxide precursors, semiconductor precursors, and metal precursors.

6. The method of claim 1, wherein the functional material comprises a metal selected from the group consisting of Pt, Pd, Ag, Au, Ru, Ni, Co, Mn, Cr, Sn, W, Ta, Ti, Mo, Rh, Re, Ir, Hf, Zr, Fe and combinations thereof.

7. The method of claim 1, wherein the functional material is a metal oxide selected from the group consisting of manganese oxides, molybdenum oxides, titanium oxides, lead oxides, tungsten oxides, ruthenium oxides, rhenium oxides, niobium oxides, iron oxides, technetium oxides, rhodium oxides, iridium oxides, chromium oxides, cerium oxides, zirconium oxides, tin oxides and combinations thereof.

8. The method of claim 1, wherein the surface of the carbon fiber comprises nanoparticles distributed thereon.

9. The method of claim 1, further comprising forming a battery electrode from the carbon fibers.

10. A method, comprising:
   (a) spraying from at least one first orifice a first solution onto a surface of a substrate, wherein the first solution comprises a carbon fiber precursor compound;
   (b) spraying from at least one second orifice, different from the first orifice, a second solution onto a surface of the substrate, wherein the second solution comprises a sacrificial polymer and a precursor compound of a functional material;
   (c) forming a first filament from the first jet, and forming a second filament from the second jet;
   (d) rotating the substrate and collecting the first filaments and the second filaments to form a mat, wherein the mat comprises a network of the first and the second filaments;
   (e) heating the mat to a first temperature above a glass transition temperature of the sacrificial polymer to cause the sacrificial polymer to flow onto the surfaces of the first filaments and at least partially coat the functional material precursor compound onto the surfaces of the first filaments; and
   (f) heating the mat to a second temperature above the first temperature and sufficient to:
      (i) form the functional material from the precursor compound of the functional material, and
      (ii) carbonize the first filaments to form an arrangement of carbon fibers;
   wherein the functional materials partially or completely coat a surface of the carbon fibers.

11. The method of claim 10, wherein the carbon fiber precursor compound comprises PAN.

12. The method of claim 10, wherein the sacrificial polymer comprises PEO.

13. The method of claim 10, further comprising maintaining the first temperature for at least one hour.

14. The method of claim 13, wherein step (e) is conducted in air.

15. The method of claim 10, further comprising maintaining the second temperature for at least one hour.

16. The method of claim 15, wherein step (f) is conducted in an inert atmosphere.

17. The method of claim 10, wherein at least one of the first and the second solutions comprise a solvent selected from the group consisting of dimethylformamide (DMF), dimethyl sulfoxide (DMSO), tetrahydrofuran (THF) and combinations thereof.

18. The method of claim 10, further comprising forming a battery electrode that includes the carbon fibers.

* * * * *

UNITED STATES PATENT AND TRADEMARK OFFICE
CERTIFICATE OF CORRECTION

PATENT NO. : 9,273,415 B2  
APPLICATION NO. : 13/607166  
DATED : March 1, 2016  
INVENTOR(S) : Kim et al.

Page 1 of 1

It is certified that error appears in the above-identified patent and that said Letters Patent is hereby corrected as shown below:

Title Page 1, column 1, line 73: "Assignee: International Business Machines Corporation, Armonk, NY (US)" should be changed to -- Assignee: International Business Machines Corporation, Armonk, NY (US), Volkswagen Group of America, Herndon, VA, (US). --

Signed and Sealed this  
Thirty-first Day of May, 2016

Michelle K. Lee  
*Director of the United States Patent and Trademark Office*